United States Patent
Voogt et al.

(10) Patent No.: US 6,442,957 B1
(45) Date of Patent: Sep. 3, 2002

(54) REFRIGERATION FOR VEHICLE

(75) Inventors: René Voogt; Dirk Jakob Wijffels, both of Groningen; Bart Eduard Cremers, Leeuwarden, all of (NL)

(73) Assignee: Biddle B.V. (NL)

( * ) Notice: Subject to any disclaimer, the term of this patent is extended or adjusted under 35 U.S.C. 154(b) by 0 days.

(21) Appl. No.: 09/615,852

(22) Filed: Jul. 14, 2000

(51) Int. Cl.[7] .................................................. B60H 1/32
(52) U.S. Cl. ............................ 62/239; 62/244; 454/188
(58) Field of Search .......................... 62/256, 239, 414, 62/426; 454/188

(56) References Cited

U.S. PATENT DOCUMENTS

| | | | |
|---|---|---|---|
| 3,215,059 A | * 11/1965 | Haas | 454/188 |
| 3,255,686 A | * 6/1966 | Larson et al. | 454/188 |
| 3,572,234 A | * 3/1971 | Schoenthaler | 454/188 |
| 3,817,160 A | 6/1974 | Searcy et al. | |
| 4,989,501 A | * 2/1991 | Catan | 98/36 |
| 5,072,658 A | * 12/1991 | Bogage | 454/188 |
| 5,784,895 A | * 7/1998 | Choi | 62/414 |
| 6,119,468 A | * 9/2000 | Seok | 62/414 |

FOREIGN PATENT DOCUMENTS

JP    11201618 A  *  7/1999  .......... F25D/11/00

* cited by examiner

*Primary Examiner*—William E. Tapolcai
*Assistant Examiner*—Mohammad M Ali
(74) *Attorney, Agent, or Firm*—Mark Zovko

(57) ABSTRACT

The invention relates to a vehicle for transporting products, comprising: a truck; a cargo space arranged on the truck for receiving the products during transport, with at least one access door; and an air curtain device close to the access door which, at least in the opened situation of the access door, generates an air curtain along a door opening of the access door, wherein the air curtain device comprises at least one fan, with an air feed duct which connects the fan to the exterior of the cargo space to supply outside air for the air curtain.

8 Claims, 2 Drawing Sheets

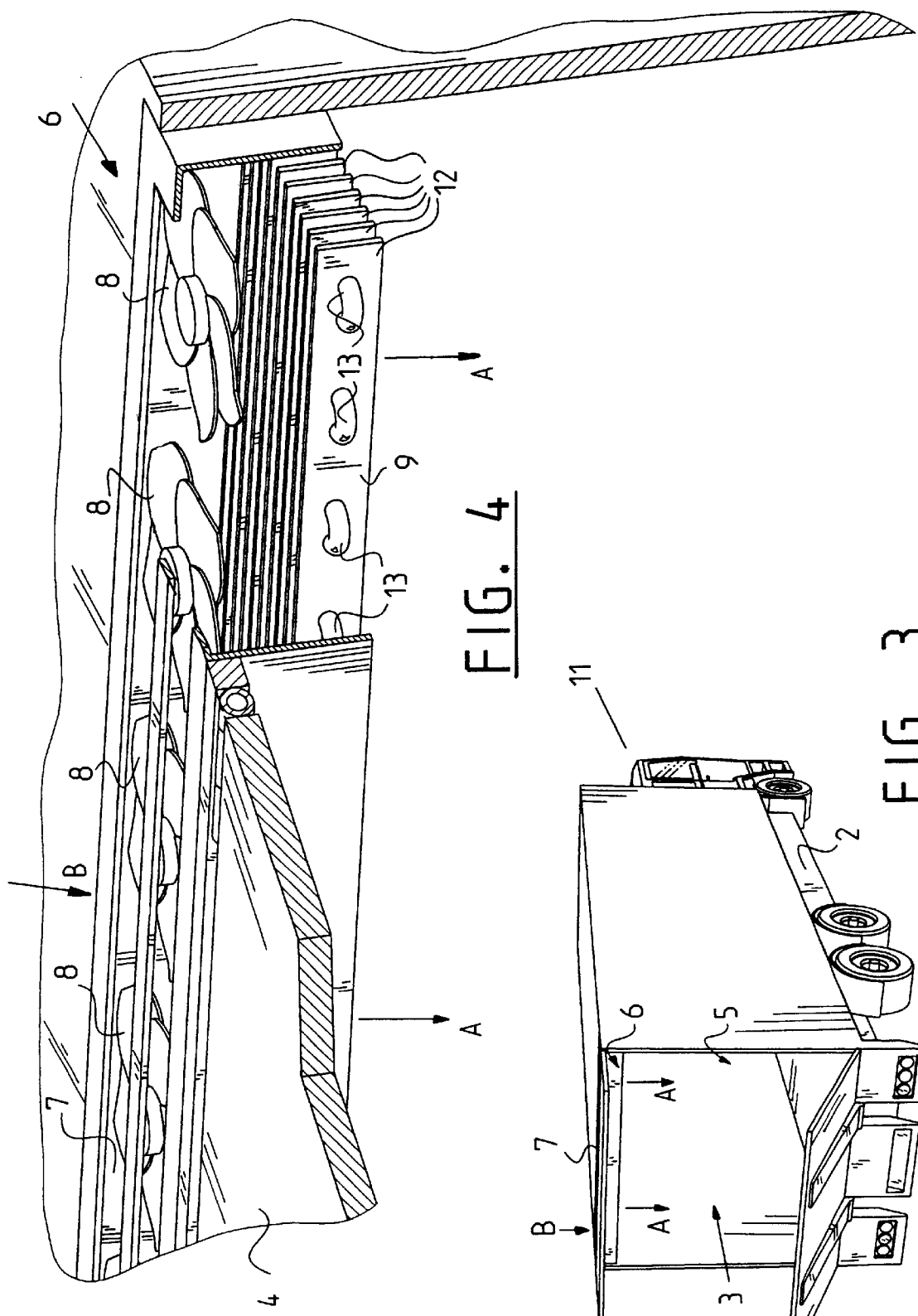

REFRIGERATION FOR VEHICLE

The present invention relates to a vehicle for transporting products, comprising: a truck; a cargo space arranged on the truck for receiving the products during transport, with at least one access door.

Such vehicles are generally known, for instance refrigerator trucks, wherein products are transported to a destination in refrigerated state in the interior of the cargo space.

The known vehicles have the drawback that when one or more than one access door is opened much cold can escape from the cargo space and/or heat can penetrate into the cargo space, which results in the danger of an adverse effect on the products being transported, particularly if these are perishable. Other known vehicles are for instance refuse collection trucks for transporting refuse in the cargo space. Such known vehicles usually have the drawback of stench nuisance which, owing to good sealing of the cargo space, only occurs at the access doors, particularly when these are opened. The present invention thus relates to diverse types of known vehicles with a cargo space for transporting products, wherein problems occur with opening of an access door to the cargo space.

Further known from CH-A-435344 is a vehicle with an air curtain device close to the access door which, at least in the opened situation of the access door, generates an air curtain along a door opening of the access door.

In the case of refrigerator trucks an air curtain generated by the air curtain device obstructs air flows which could result in increase in the temperature in the cargo space. In the case of refuse trucks, stench emission is prevented to a large extent, while the problems associated with opened access doors in other types of vehicle are effectively combatted by arranging the air curtain device according to the present invention.

The vehicles known from CH-A-435344 have the drawback that the air curtain devices which are placed herein at the access door often cause undesired turbulence in the interior of the cargo space. Such turbulence in the cargo space is particularly undesirable in refrigerator trucks. Further, in other types of transport vehicle such as refuse trucks, wherein stench is a relevant factor, stench nuisance adjacently of and outside the vehicle is not obviated, or hardly so.

The present invention has for its object to obviate the above stated and other problems of known vehicles and provides for this purpose a vehicle which is distinguished in that the air curtain device comprises at least one fan, with an air feed duct which connects the fan to the exterior of the cargo space to supply outside air for the air curtain. In such an embodiment of the present invention an air circulation unfavourable for a refrigerator truck is prevented in the interior of the cargo space. In addition, in the case of for instance a refuse truck, outside air is used for the air curtain, which is favourable in holding inside the cargo space the strong-smelling air or vapours of the refuse to be transported in the cargo space.

In a second advantageous embodiment a vehicle has at least two access doors, each having an air curtain device, wherein at each of the access doors is arranged at least one detector, such as a door switch, which sets into operation the air curtain device associated with a relevant one of the access doors when the access door is opened. Thus is provided an energy-saving configuration, wherein only one air curtain device associated with the relevant opened access door is set into operation, while air curtain devices associated with other, still closed access doors remain inoperative.

In a third advantageous embodiment the air curtain device comprises an air feed duct and a fan, and a screen with air passages is arranged in the air feed duct with which the fan is protected against splash-water. The air curtain device of the vehicle according to the present invention is hereby efficiently protected against moisture, which increases the lifespan and reliability thereof.

Two embodiments of a vehicle with air curtain device according to the present invention are described hereinbelow with reference to the annexed figures, in which:

FIG. 3 is a perspective view of another embodiment of a vehicle according to the present invention; and FIG. 4 is a partly cut-away perspective view of a detail of the vehicle shown in FIG. 3.

Corresponding components shown in separate figures are designated with the same reference numerals.

Figure 1:
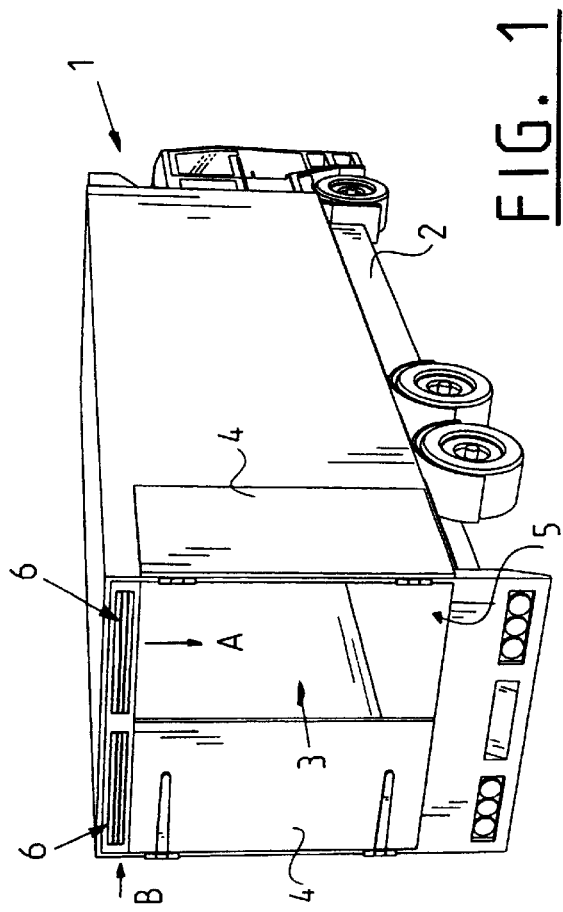
FIG. 1 shows a perspective view of a vehicle according to the present invention.

The vehicle 1 shown in FIG. 1 comprises a truck 2 with a cargo space 3 arranged thereon. In the embodiment shown here cargo space 3 is provided with two access doors 4 with which a door opening 5 of cargo space 3 can be closed.

At door opening 5 are arranged two separate air curtain devices 6 with which an air curtain can be generated in the direction of arrow A to form a separation between the outside and the inside of cargo space 3. The separation thus formed by the air curtain in the direction of arrow A is passable, and a person can easily walk through it, but the air curtain forms an efficient temperature barrier as well as a barrier holding for instance stench in the interior of cargo space 3, depending on the application of vehicle 1 according to the present invention.

In the embodiment shown here the vehicle 1 is a refrigerator truck, but additionally or alternatively the vehicle can be for instance a refuse truck or other random vehicle, wherein the forming of a passable barrier in the door opening of cargo space 3 thereof can be applied according to the present invention.

As described above, cargo space 3 comprises two separate doors 4. An individual air curtain device 6 is associated with each of the doors 4. Door opening 5 is effectively also divided into two parts by the separate doors 4, wherein an air curtain can be generated in the direction of arrow A in each of the parts of door opening 5 by a relevant one of the air curtain devices 6. Air curtain devices 6 can also be individually set into operation, preferably using a door switch (not shown) or a similar detector, wherein a relevant one of the air curtain devices 6 is set into operation when an associated access door 4 is opened. Air curtain devices 6 can thus be set into operation separately, subject to the position of the associated access doors 4.

Figure 2:
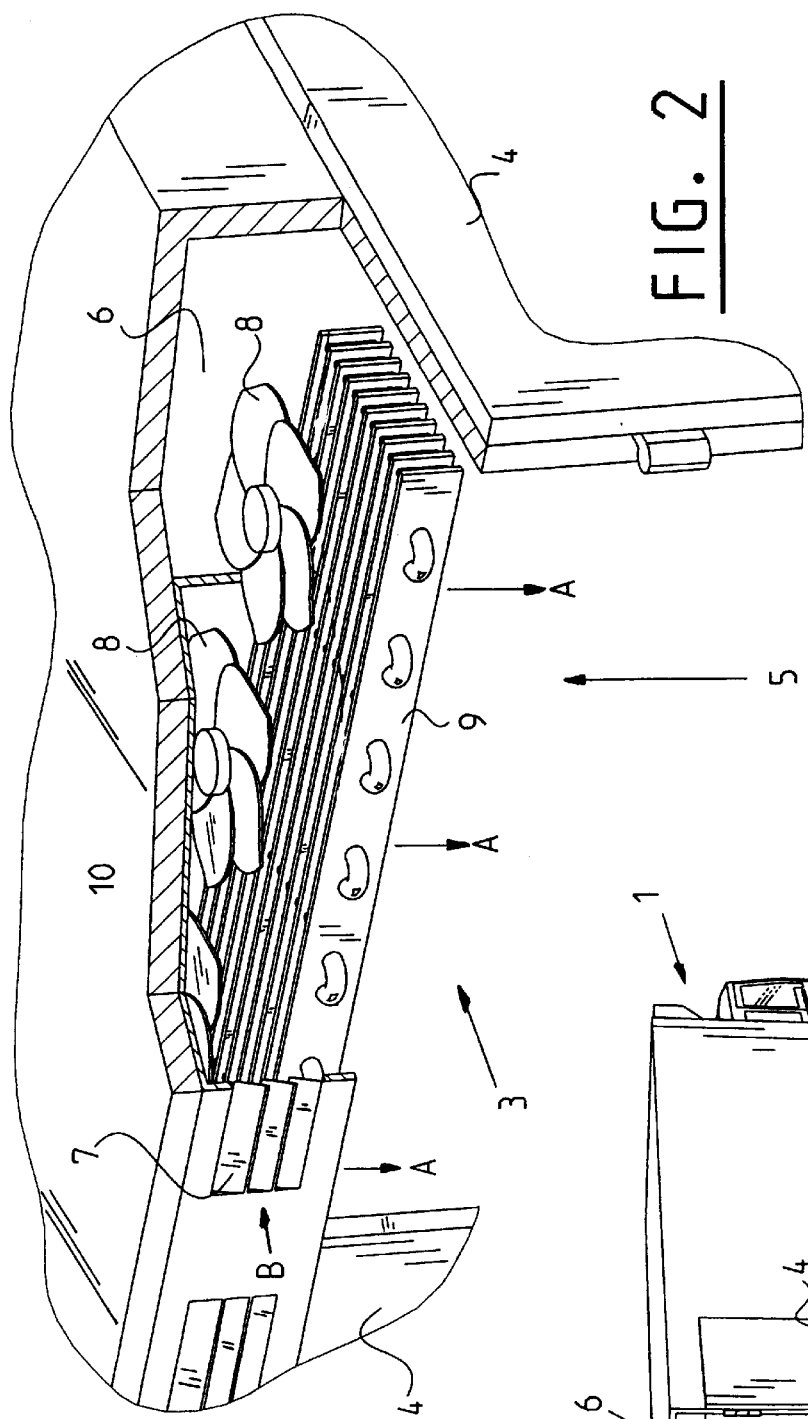
FIG. 2 shows a partly cut-away perspective view of a detail of the vehicle shown in FIG. 1.

As shown in FIG. 2, outside air is drawn in from outside cargo space 3 through opening 7 in the direction of arrow B. Air curtain device 6 comprises fans 8 which are arranged in an array parallel to door opening 5. Fans 8 thrust the air drawn in through opening 7 in the direction of arrow B in downward direction through a blow-out grid 9. Blow-out grid 9 ensures the desired orientation of the air curtain in the direction of arrow A over a distance corresponding with the dimensions of door opening 5, this in combination with fans 8 and particularly the power thereof.

Arranged between opening 7 and fans 8 is a splash-water screen 10 which in the shown embodiment consists of plate strips. Many alternative embodiments are of course possible, such as a perforated plate. Splash-water screen 10 provides an (additional) protection of fans 8 against weather conditions outside vehicle 1. Splash-water screen 10 has a large passage area between the strips such that in combination with the power of fans 8 a sufficiently strong air curtain can still be formed in the direction of arrow A with the fans 8. Splash-water screen 10 at the top in FIG. 2 is preferably disposed inclining obliquely rearward so as to provide the largest possible suction area for air curtain device 6 which is still splash-watertight.

FIG. 3 shows another embodiment of a vehicle 11 according to the present invention. Vehicle 11 in this embodiment differs from vehicle 1 of FIG. 1 owing to the configuration of the doors 4 and the placing of the opening 7 for drawing in air for the air curtain to the fans 8.

In the embodiment shown in FIG. 3 the doors 4 divide the door opening 5 into two parts separated in vertical direction. Since air curtain devices 6 are also arranged at the top of door opening 5 in the embodiment shown here so as to generate an air curtain in the direction of arrow A, it is possible to suffice with a single air curtain device 6 extending along the full width of door opening 5. This single air curtain device 6 can be set into operation when one of the two access doors 4 is opened. Alternatively, a choice can be made to set air curtain device 6 into operation only when both doors 4 are opened.

FIG. 4 shows a partly cut-away perspective view of a detail of the vehicle 11 shown in FIG. 3. Compared to FIG. 2 the splash-water screen is absent here and, as alternative, the opening 7 for drawing in air in the direction of arrow B to fans 8 is arranged on the top side.

As in the embodiment of FIGS. 1 and 2, blow-out grid 9 of air curtain device 6 comprises a number of plates 12 of for instance metal or plastic in parallel arrangement, wherein the air for the air curtain is thrust by the fans through the space between plates 12 in the direction of arrow A. Plates 12 of blow-out grid 9 are mutually connected by means of brackets 13 to which plates 12 are fixed in order to maintain the mutual positioning of plates 12 relative to each other.

After acquainting himself with the foregoing disclosure the skilled person will be confronted with a number of alternative embodiments falling within the scope of protection of the appended claims. The splash-water screen shown in FIG. 2 can thus be designed in the same way as the blow-out grid instead of the above mentioned perforated plate. The power and mutual spacing between the fans depends on the distance which has to be spanned by the air curtain. This is a parameter which can be determined by the skilled person without inventive work. The blow-out grid 9 itself can also be designed in many different ways, as a number of tubes placed against each other with filler therebetween, wherein using the fans the air for the air curtain is pressed through the interior of the tubes and the air flow is directed to form the air curtain. Instead of the used brackets can be applied additional plates running transversely relative to the used plates, wherein the plates shown in the figures are fixed to the additional plates.

As alternative to the refrigerator truck shown in the figures the vehicle can be a refuse truck, wherein the air curtain generated by the air curtain device limits stench outside the refuse truck.

What is claimed is:

1. Vehicle for transporting products, comprising:

a truck;

a cargo space arranged on the truck for receiving the products during transport, with at least one access door; and an air curtain device close to the access door and inside the cargo space which, at least in the opened situation of the access door, generates an air curtain along a door opening of the access door, wherein the air curtain device comprises at least one fan, with an air feed duct which connects the fan to the exterior of the cargo space to supply outside air for the air curtain.

2. Vehicle as claimed in claim 1, wherein the air curtain device comprises at least one additional air feed duct which connects the or an additional fan to the interior of the cargo space.

3. Vehicle as claimed in claim 1, wherein in the flow direction of air flowing through the fan an elongate blow-out grid extending parallel to the door opening is arranged behind the fan and has a thickness and passages such that the air flow is directed parallel to the door opening along substantially the whole door opening.

4. Vehicle as claimed in claim 1 which has at least two access doors, each having an air curtain device, wherein at each of the access doors is arranged at least one detector, such as a door switch, which sets into operation the air curtain device associated with a relevant one of the access doors when the access door is opened.

5. Vehicle as claimed in claim 1, wherein the air curtain device comprises an air feed duct and a fan, and a screen with air passages is arranged in the air feed duct with which the fan is protected against splash-water.

6. Vehicle as claimed in claim 5, wherein the screen is placed obliquely in the air feed duct.

7. Vehicle as claimed in claim 1, wherein the vehicle is a refrigerator truck.

8. Vehicle as claimed in claim 1, wherein the vehicle is a refuse truck.

* * * * *